United States Patent
Miyata et al.

(10) Patent No.: US 7,069,393 B2
(45) Date of Patent: Jun. 27, 2006

(54) STORAGE SYSTEM PROVIDING FILE AWARE CACHING AND FILE AWARE REMOTE COPY

(75) Inventors: Kenichi Miyata, Kawasaki (JP); Naoto Matsunami, Hayama (JP); Koji Sonoda, Sagamihara (JP); Manabu Kitamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 172 days.

(21) Appl. No.: 10/270,514

(22) Filed: Oct. 16, 2002

(65) Prior Publication Data

US 2003/0225972 A1 Dec. 4, 2003

(30) Foreign Application Priority Data

Jun. 3, 2002 (JP) .............................. 2002-160910

(51) Int. Cl.
- G06F 12/00 (2006.01)
- G06F 17/30 (2006.01)
- G06F 15/16 (2006.01)

(52) U.S. Cl. .......................... 711/145; 709/214; 707/1; 711/113; 711/214; 711/114

(58) Field of Classification Search ................ 711/112, 711/113, 114
See application file for complete search history.

(56) References Cited

U.S. PATENT DOCUMENTS

| | | | |
|---|---|---|---|
| 6,370,614 B1 * | 4/2002 | Teoman et al. | 711/113 |
| 6,567,889 B1 * | 5/2003 | DeKoning et al. | 711/114 |
| 6,766,413 B1 * | 7/2004 | Newman | 711/113 |
| 2002/0032671 A1 * | 3/2002 | Linuma | 707/1 |
| 2003/0033308 A1 * | 2/2003 | Patel et al. | 707/10 |
| 2003/0158999 A1 * | 8/2003 | Hauck et al. | 711/113 |
| 2003/0236850 A1 * | 12/2003 | Kodama | 709/214 |

* cited by examiner

*Primary Examiner*—Mano Padmanabhan
*Assistant Examiner*—Duc T Doan
(74) *Attorney, Agent, or Firm*—Mattingly, Stanger, Malur & Brundidge, P.C.

(57) ABSTRACT

A computer system in which a host computer is connected to a storage unit, the storage unit operating in a unit of a file. A file attribute control unit and the storage unit execute the processing being linked together so that, in response to a request from a client computer, the host computer executes a file attribute control program to add a particular attribute to the file, and that the storage unit operates in response to the attribute that is added.

4 Claims, 11 Drawing Sheets

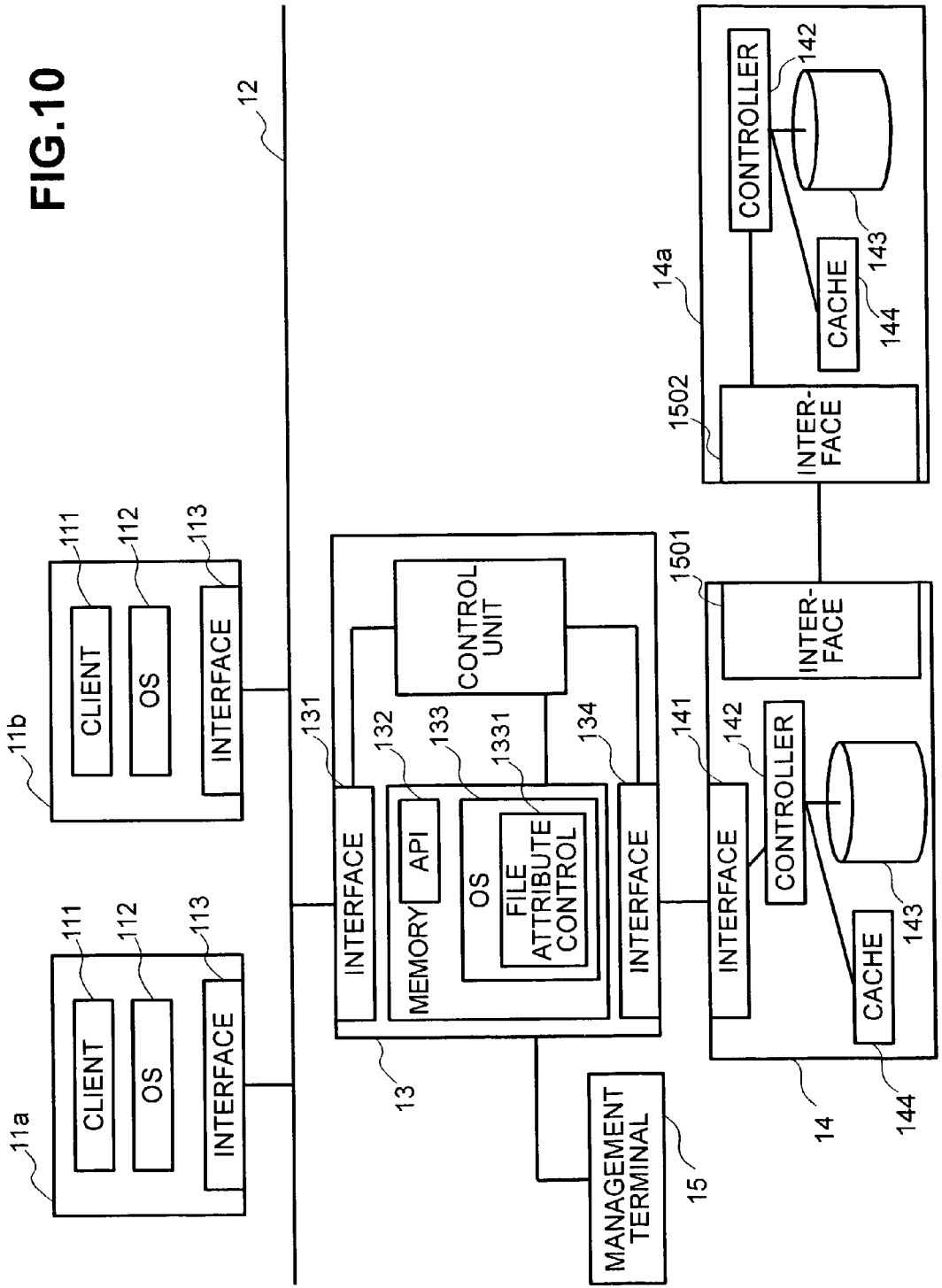

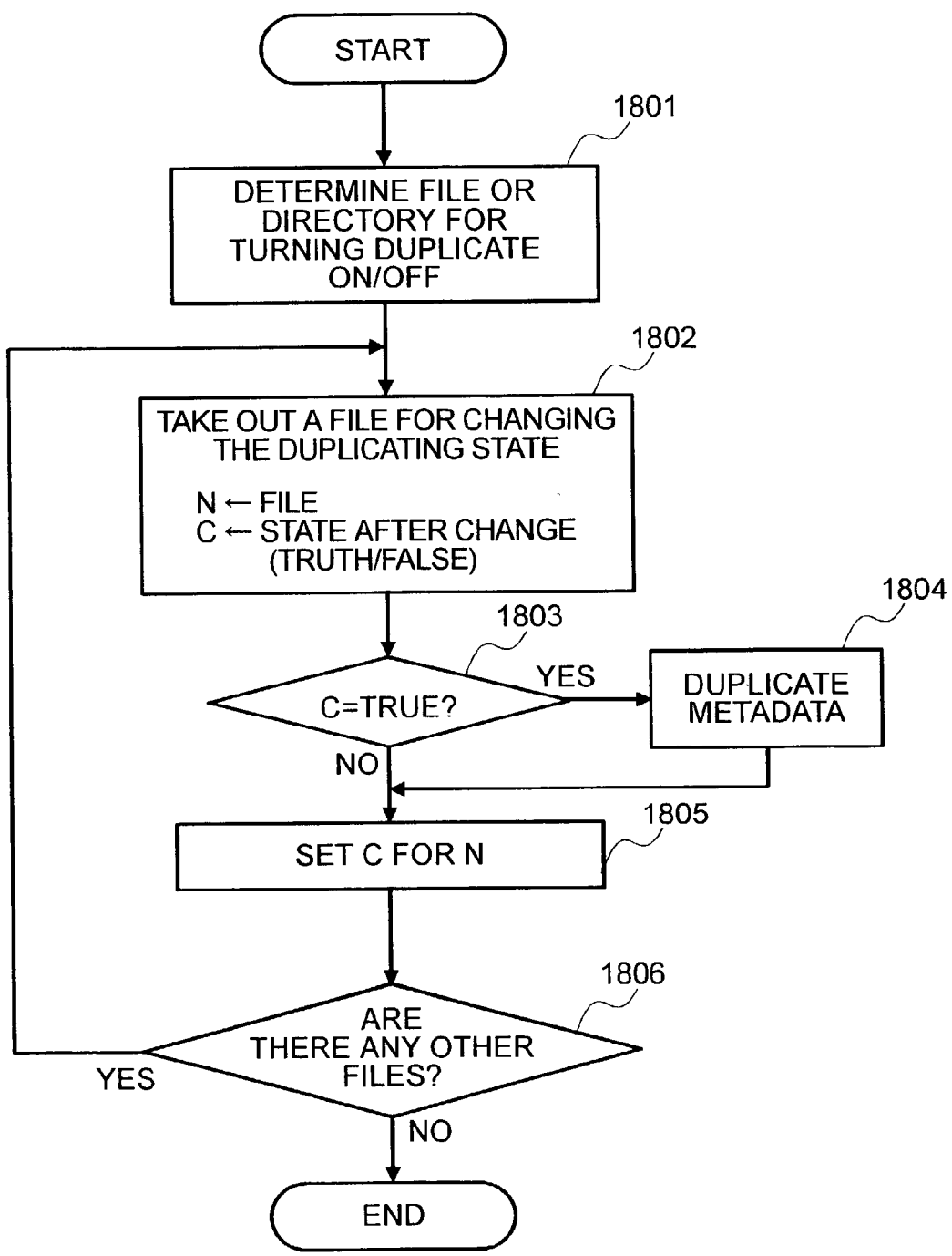

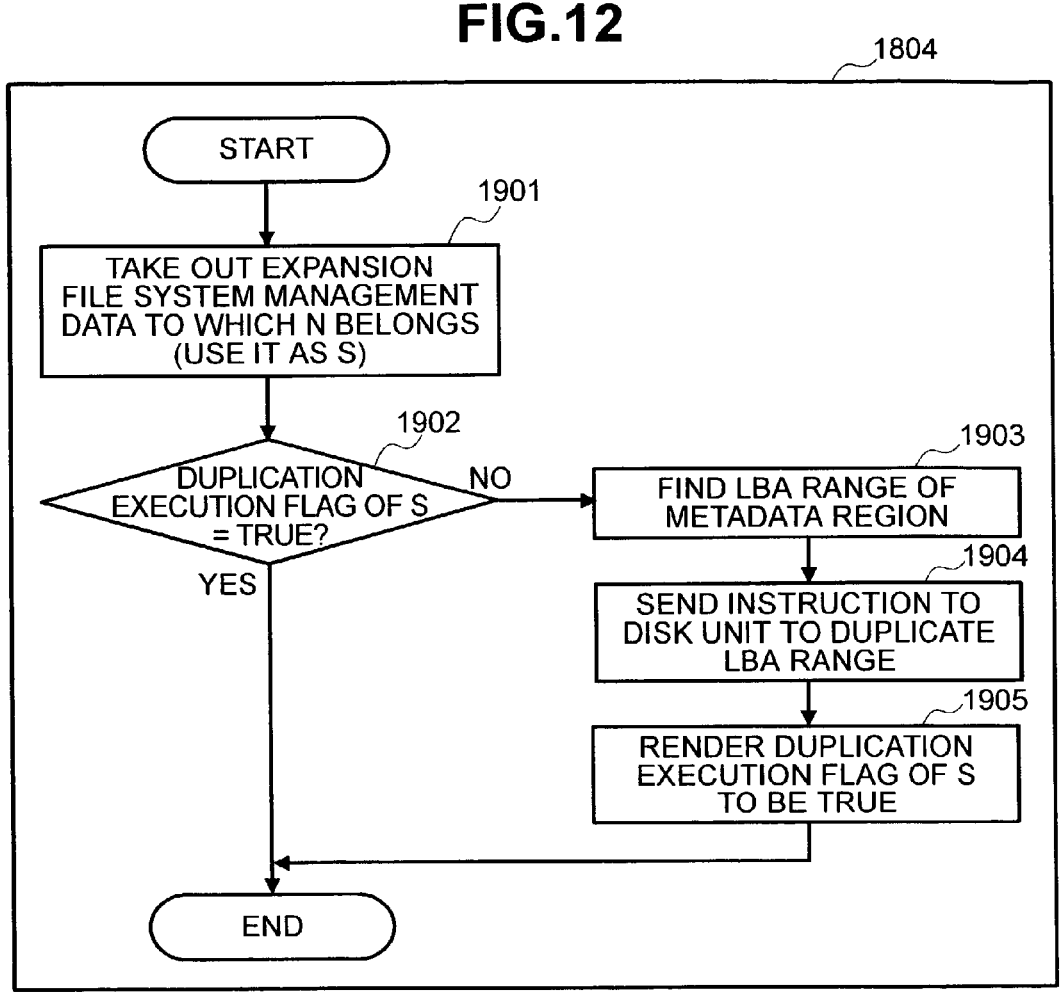
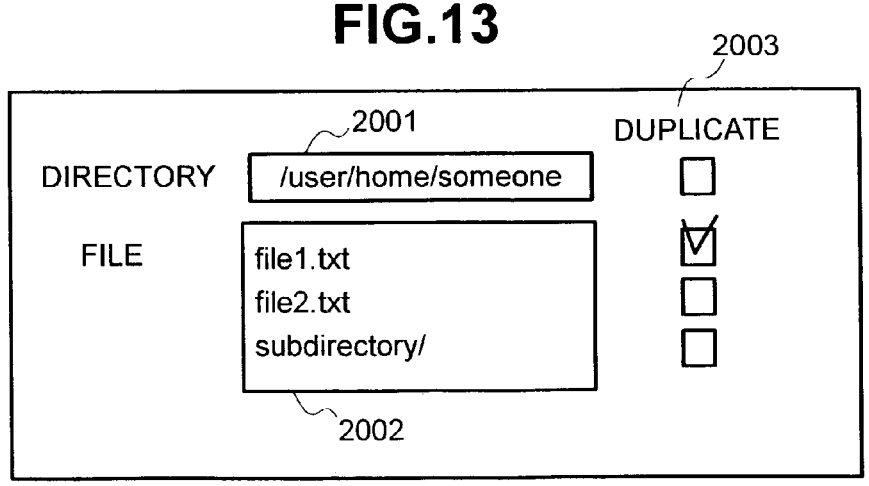

STORAGE SYSTEM PROVIDING FILE AWARE CACHING AND FILE AWARE REMOTE COPY

BACKGROUND OF THE INVENTION

Field of the Invention

In recent years, there has been contrived a technology in an attempt to share a storage unit by a plurality of computers having different architectures and different operating systems through a network. NAS (network attached storage) is a storage system in which an operating system is added to a storage unit. By using NAS, a computer connected to the network is allowed to share the data in a unit of a file that is stored in the NAS.

The storage system of the network sharing type such as NAS is expected to efficiently execute the processing for making a reference from a plurality of computers, to respond at high speed and to offer safety preventing the shared data from being lost due to some cause.

A storage unit generally uses a cache memory for offering a high-speed response. To accomplish a high-speed response, further, there has also been proposed a method that uses a sticky bit which is a function of the operating system.

As a file is read into a main storage of a computer from a disk unit possessed by the storage unit, the file to which a sticky bit is attached resides in the main storage during the execution of the file and even after it is executed.

In general, a reference can be made to the data stored in the main storage at a speed higher than that of when making a reference to the data stored in the disk unit. Upon having the file residing in the main storage, therefore, the file can be executed at a high speed.

To maintain safety of the data, on the other hand, there has been proposed a technology according to which the storage unit itself duplicates the data stored in the storage unit into a separate medium.

In general, the storage unit manages the data with blocks which each is a predetermined data unit. When the storage unit is provided with a cache, therefore, it becomes possible to make a reference to the data at a high speed in a unit of a block.

Here, when the cache is employed for the NAS device, the user of the NAS makes a reference to the data in a unit of a file. It is therefore desired that the blocks constituting the file are all stored in the cache.

However, since the storage unit possessed by NAS does not know the file structure, there occurs such a phenomenon that only some of the blocks are stored in the cache, or the data on the cache are expelled from the cache with the passage of time. When such a phenomenon occurs, the data are not efficiently referred to when it is attempted to refer to the data in a unit of a file.

According to the method based on the sticky bit, it is allowed to have the file reside in the main storage. In the case of the NAS device in which there occurs a request for reading the data in the same file from a plurality of computers, it is probable that the data are frequently requested to the NAS device to be read. However, the storage unit possessed by NAS does not always store the blocks constituting the file in the cache. Therefore, the load increases in updating the data in the storage unit, and a quick response is not often accomplished.

According to the prior art, further, the unit for duplicating the data is the whole disk, and even some blocks that have not been used as a file are duplicated together. Here, if the storage medium storing the duplicated data is located in a physically isolated place, a greatly increased period of time is required for the duplication since the circuit for flowing the data in many cases has a small capacity (the data of only a small amount are transferred in a predetermined period of time).

SUMMARY OF THE INVENTION

It is an object of this invention to provide a technology for processing the data in a unit of a file at a high speed in a storage system that is connected to a network.

In order to solve the above object according to the invention, the attribute of the file of a file system is provided with a particular attribute, so that the storage unit in the storage system operates being linked to a computer which executes the operating system. The computer issues a predetermined instruction to the storage unit in a unit of a file, so that the storage unit executes a predetermined processing.

As a concrete embodiment, the storage unit stores, in a cache memory, a data block corresponding to a specified file. In this case, data representing whether residence is needed is given to the cache device as an attribute of the file.

As another embodiment, the storage unit transfers the data block corresponding to the specified file to another storage unit. In this case, data representing whether duplication is needed is given as an attribute of the file.

According to this invention, the storage unit is allowed to operate in accordance with the data added to the file.

BRIEF DESCRIPTION OF THE DRAWINGS

FIG. 10 is a diagram of a storage system according to a second embodiment of the invention;

FIG. 11 is a flowchart illustrating the processing for registering/resetting a duplication function in a second embodiment of the invention;

FIG. 12 is a flowchart illustrating a processing for duplicating the metadata according to the second embodiment of the invention;

FIG. 13 is a view of a screen for specifying a file for registering/resetting the duplication function according to the second embodiment of the invention;

DETAILED DESCRIPTION OF THE PREFERRED EMBODIMENT

Figure 1:
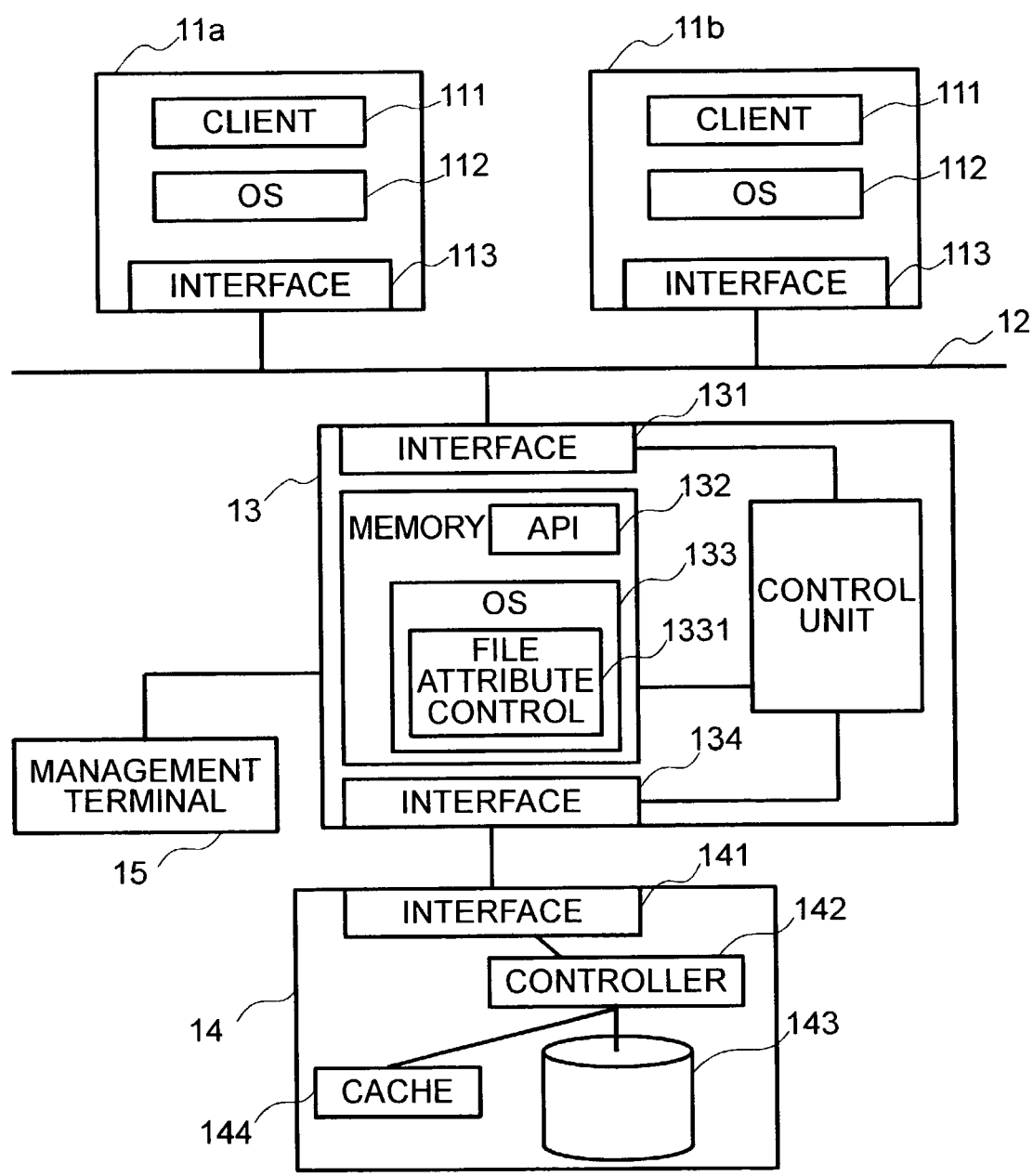
FIG. 1 is a system diagram illustrating a first embodiment of this invention.

FIG. 1 is a diagram illustrating the constitution of a first embodiment of a computer system to which the invention is applied. The computer system includes a storage system and computers (hereinafter referred to as "client computers") 11 used by the clients, which are connected together through a network 12.

The storage system includes a host computer 13, a storage unit 14, and a management terminal 15 for managing the states of the host computer and the storage unit. The host computer 13 is connected to the client computers 11a and 11b through the network 12. In FIG. 1, two client computers are shown for simplicity. It should, however, be noted that the invention is not affected by the number of the client computers.

The host computer 13 includes an interface 131 for connection to the network 12, an interface 134 for connection to the storage unit 14, an control unit and a memory. The memory stores an API (application program interface) 132 and an operating system 133 for providing the extended storage unit function to the client computers 11a and 11b. API is a program executed by the control unit.

The operating system 133 has a file attribute control program 1331 for expanding the function of the storage unit. The API 132 is a program executed by a control unit when an instruction received from the client computer 11 is to be transmitted to the file attribute control program 1331.

The storage unit 14 includes an interface 141 connected to the host computer 13, a disk unit 143, a cache unit 144, and a controller 142 for controlling the disk unit 143 and the cache unit 144. A magnetic medium is in many cases used as the disk unit 143. However, there may be used a device that utilizes an optical medium.

The storage unit 14 may be the one having a disk unit 143 or may be the one having a plurality of disk units 143, such as RAID.

The client computers 11a and 11b (or client computers 11 as a whole) have an interface 113 connected to the network, a control unit and a memory (not shown). The memory stores a client program 111 for utilizing the function of the host computer 13, and an operating system 112.

An instruction from the client computer 11 is transmitted to the control unit in the host computer through the interface 113 and the interface 131 in the host computer 13.

Figures 2, 3:
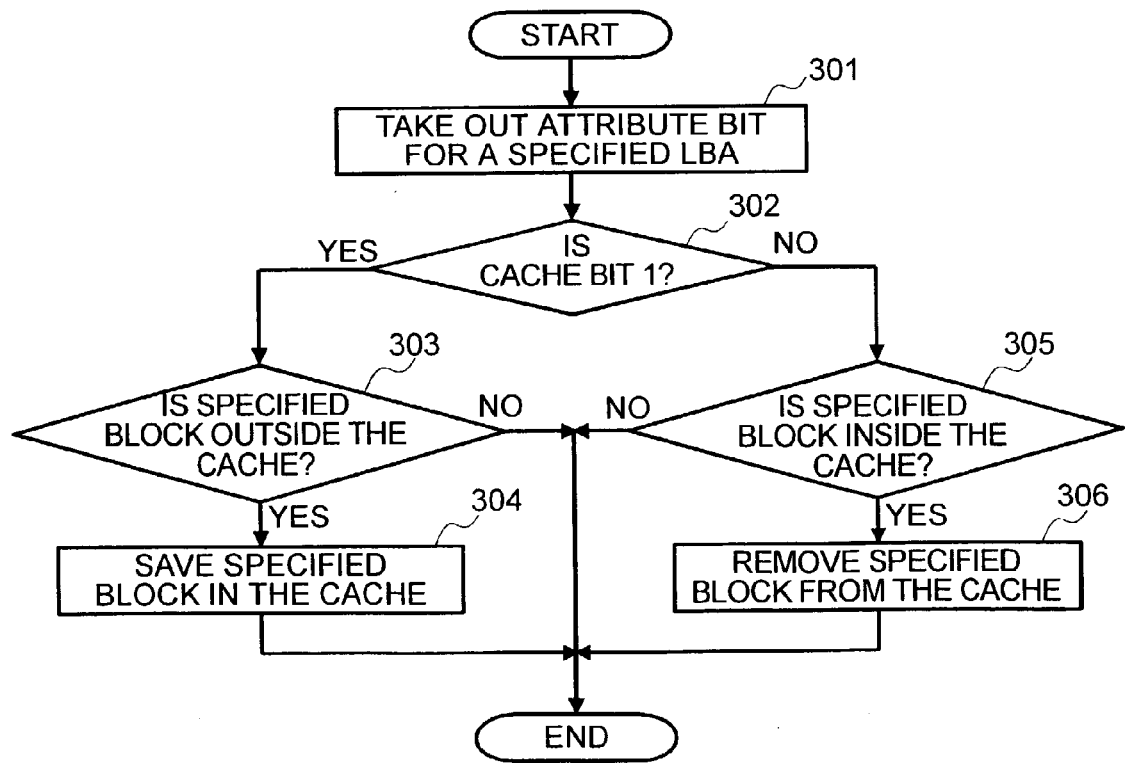
FIG. 2 is a table of block attributes.
FIG. 3 is a flowchart of control operation of when a cache residence attribute of a disk block have been defined.

FIG. 2 is a table of block attributes stored in the disk unit 143 and managed by the controller 142. The disk unit 143 is divided into blocks of a particular size, and the block positions are exclusively determined by the LBA (logical block address). For example, the data are referred to from the operating system 133 by using the LBA while specifying the positions thereof on the disk unit and the number of the blocks.

The table of block attributes has an LBA entry 201 and an attribute bit sequence entry 202. In the attribute bit sequence entry 202 are registered bit sequences comprising 0 and 1. A particular bit in a bit sequence or a bit sequence that is registered has been so defined as to represent some attribute. The storage unit 14 operates according to the attribute that has been defined in advance.

In this invention, part of predefined bits in the bit sequence or a newly added bit 203 (hereinafter referred to as "attribute bit 203") registered to the attribute bit sequence entry 202 is controlled through the operating system 133. The storage unit 14 receives a set of LBA, attribute bit position and bit value as an instruction from the host computer 13, and sets the specified value to the table of block attributes.

FIG. 3 is a flowchart illustrating a processing of when a cache residence attribute of the disk block is defined in the attribute bit 203. The cache residence attribute represents the data related to the residence in the cache of the data block. This processing is executed when the user has instructed the residence of file.

The controller 142 finds the attribute bit for the specified LBA from the table of block attributes (step 301). Then, the controller 142 judges whether the value of the attribute bit 203 representing the residence of cache is 1 among the attribute bits that are found (step 302). When it is 1, the controller 142 judges whether the block for the specified LBA has not been stored in the cache device 144 (step 303).

When the block corresponding to the specified LBA has not been stored in the cache device 144, the controller 142 reads the specified block from the disk device 143 and stores it in the cache device 144. When the specified block has already been stored in the cache device 144, the controller 142 ends the processing.

When the value of attribute bit 203 is 0 at step 302, on the other hand, the controller 142 judges whether the block for the specified LBA has already been stored in the cache device 144 (step 305). When the block for the specified LBA has been stored in the cache device 144, the controller 142 removes the specified block from the cache device 144. When the block for the specified LBA has not been stored in the cache device 144, the controller 142 ends the processing (step 306).

Figure 4:
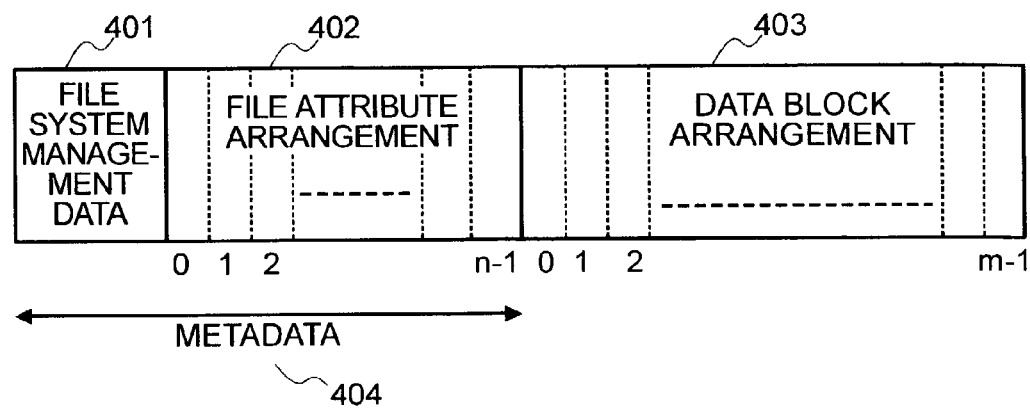
FIG. 4 is a diagram illustrating the constitution of a file system.

FIG. 4 is a diagram illustrating the constitution of a file system built up in the disk device 143. The operating system 133 builds up the file system in the disk device 143, and manages the data in a unit of a file. The file system is constituted by a file system management data region 401, a file attribute array region 402 and a data block array region 403.

Further, the file system management data region 401 and the file attribute array region 402 in combination are called metadata region 404. These regions are arranged in the disk device 143 from the left toward the right in FIG. 4.

Into the file system management data region 401 are registered the data representing the number of the file attributes, number of the data blocks and the block size. The number of the file attributes represents the number of elements in the file attribute array 402. The number of the data blocks represents the number of elements in the data block array 403.

The number of the file attributes and the number of the data blocks are set at the time when the file system is built up. The block size is the size of the data block of the disk device 143. The file is divided in a unit of the block size and is stored in the disk device 143. The file includes a plurality of data blocks constituting the data of the file, and a file attribute holding the data related to the file.

In the file attribute array region 402, there are registered the data representing the kind of file, date the file is written, owner of the file, right for making a reference to the file, and array of the data block numbers.

The kind of file is the data representing whether the file is a normal file or a directory file. The directory file is handled in the same manner as the normal file in the file system. The directory file includes the data representing a list of relationships between the file names of files stored in the directory and the file attribute numbers (element numbers in the file attribute number array 402) corresponding to the file names.

The right for making a reference to the file is the data for specifying the right for making a reference to the file. Details related to the right for making a reference have been described in "The Design and Implementation of the 4.3 BSD UNIX Operating System", Samuel J. Leffler, et al., Addison-Wesley, 1989, pp. 58–60, and are not described in this specification.

The array of the data block numbers is for listing the data block numbers (element numbers in the data block array 403) in order on the disk constituting the file. The number of elements in the data block number array is usually a fixed value. In the case of a file having a size larger than the product of a fixed number of elements and a block size, a data block for containing the block numbers is separately assigned, and the number of the new data block is held at a terminal of the arrangement of the data block numbers. Its details have been described in "The Design and Implementation of the 4.3 BSD UNIX Operating System", Samuel J. Leffler, et al., Addison-Wesley, 1989, pp. 191–195, and are not described in this specification.

When a file system is built up, there are created the array of file attributes of a fixed number of elements and the array of data blocks of a fixed number of elements. When a file is to be newly created, the operating system 133 of the host computer 13 allocates blocks of a number large enough for containing the data of the file from the data block array 403, writes data therein, takes out an unused element from the file attribute array 403, and sets the attribute of file to the element.

Figure 5:
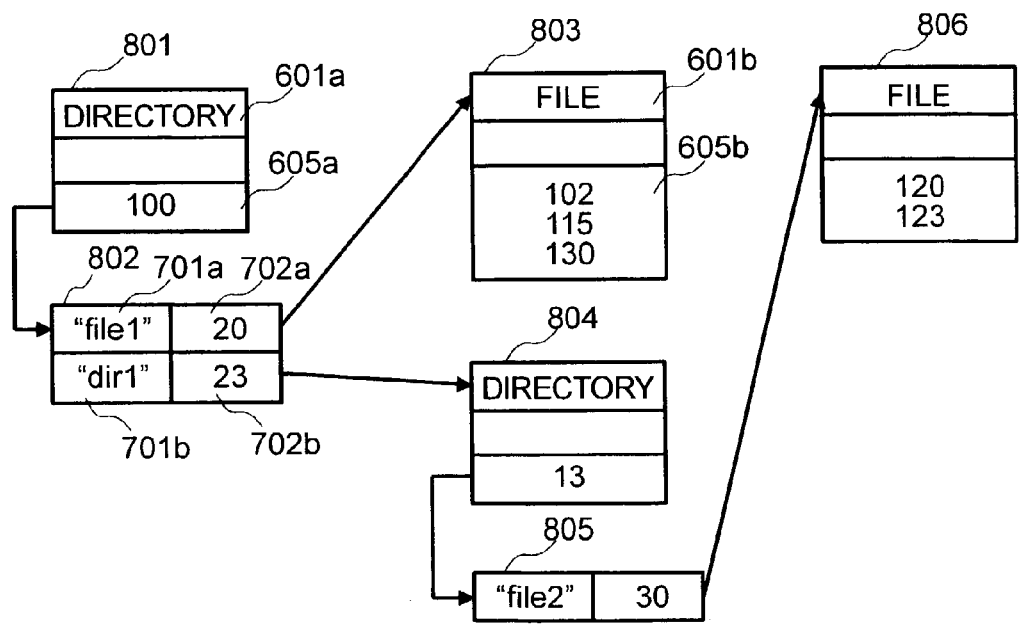
FIG. 5 is a diagram illustrating a connection relationship between the directories and the files.

FIG. 5 is a diagram illustrating a relationship between the directories and the files. A "directory" 601a has been set as the kind of file to the file attribute 801, and a number 100 has been stored as the data block number 605a. The data block 802 of the number 100 is a directory file, and in which are stored the file name "file 1" (701a), the file attribute number 20 (702a) of the file, file name "dir 2" (701b) and the file attribute number 23 (702b) of the file.

There are stored that the kind of the file attribute number 20 (803) is a file (601b), and that the data blocks constituting the file are those of Nos. 102, 115 and 130 (605b). The file attributes 804, 806 and the directory file 805, too, are related in the same manner. In the connection relationship between the directories and the files, the directory at the highest position is called root directory.

The constitution of the extended file attribute will now be simply described. The extended file attribute is the one in which an attribute representing necessity for caching of data blocks is added to the entry of the file attribute described earlier. Depending upon the truth/false of attribute representing whether caching is necessary, the controller 142 instructs whether the data blocks of the corresponding file be all allowed to reside in the cache device 144 of the storage unit 14. The operation will now be described in detail with reference to FIGS. 6 to 9.

In this embodiment, the attribute of attribute bit 203 represents whether the data be allowed to reside in the cache unit 144. The attribute bit 203 having a value of 1 represents that the data is allowed to reside in the cache, and the attribute bit 203 having a value of 0 represents that the data is not allowed to reside in the cache.

Figure 6:
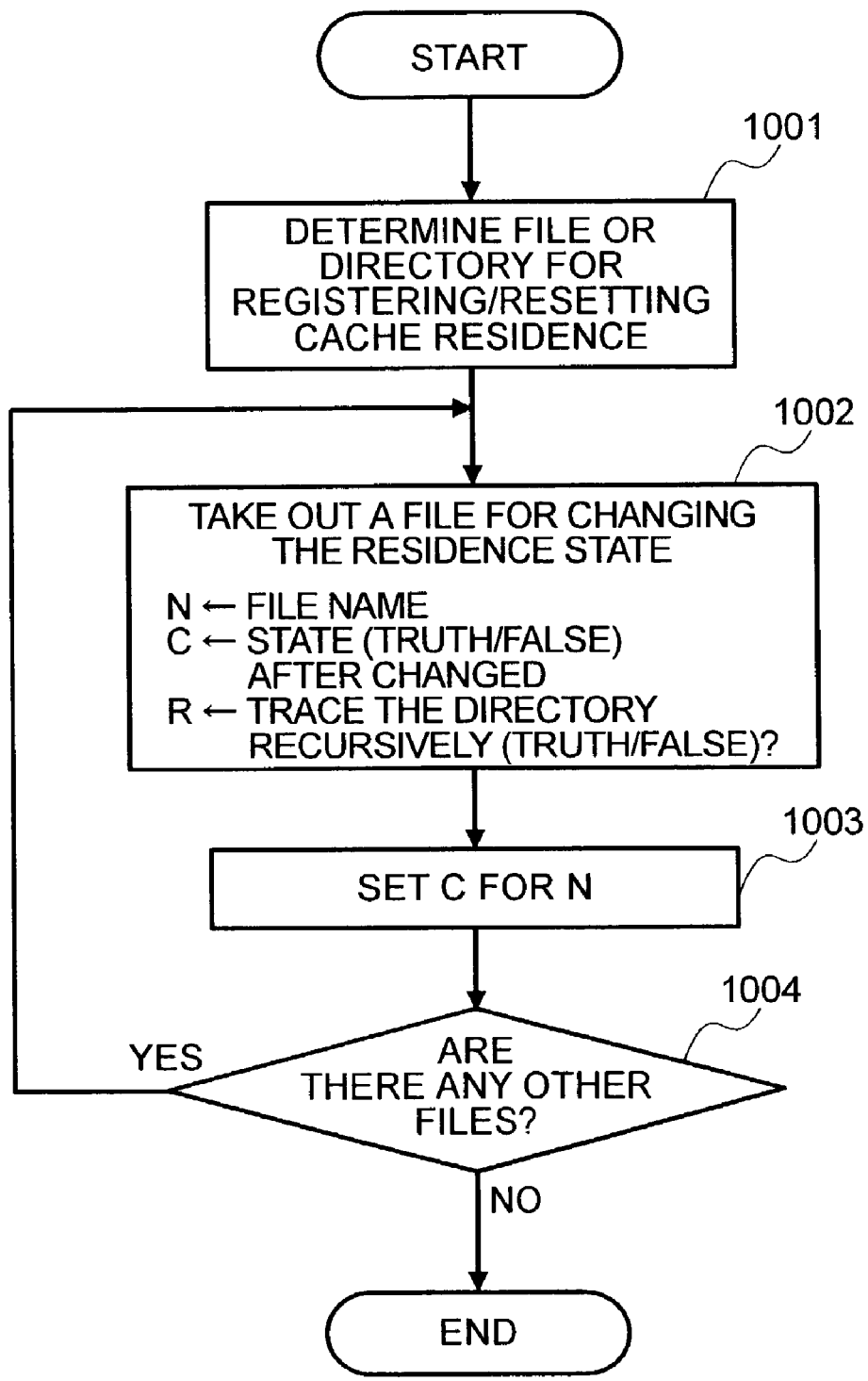
FIG. 6 is a flowchart illustrating a processing for registering/resetting a cache residence function in the first embodiment of the invention.

FIG. 6 is a flowchart for registering/resetting the cache residence function according to the first embodiment. A file or a directory is determined for registering/resetting the cache residence function. This step is executed on the client computer 11 or on the management terminal 15. The details will be described later. The determined data such as file is transferred to the host computer 13 through the network 12 (step 1001).

The processing from step 1002 to step 1004 is carried out as the host computer 13 executes the file attribute control program 1331. Based upon the data that is transferred, the host computer 13 selects the specified file from the file system. For the variables N, C and R respectively, the host computer 13 substitutes the filename, the state after the cache residence function is changed and the truth/false value specifying whether the host computer 13 set these data to files in a directory recursively when the cache residence function is specified for the directory, so that they can be used in the subsequent processing (step 1002).

Thereafter, the host computer 13 sets the registering/resetting of the cache residence function to the specified file N. The details will be described later (step 1003). Thereafter, the host computer 13 checks whether there still are files to be processed. When there still are files, the routine returns back to step 1002 to repeat the processing. When there is no file, the registering/resetting of the cache residence function ends (step 1004).

Figure 7:
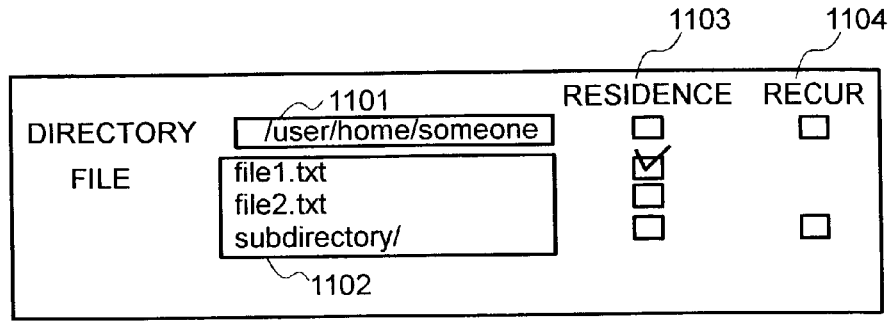
FIG. 7 is a view of a screen for specifying a file for registering/resetting the cache residence function according to the first embodiment of the invention.

FIG. 7 is a view of a screen for specifying a file for registering/resetting the cache residence function. The client program executed by the client computer 11 or the management terminal 15 connected to the host computer 13 displays the picture of FIG. 7 to a user who registers/resets the cache residence function through the screens possessed by the individual computers.

The screen displays a region 1101 showing the directory that is now being used, a region 1102 showing a list of files and directories stored in the directory now being shown on the region 1101, check buttons 1103 indicating the resident states of the files and for specifying the registering/resetting of the residence function, and check buttons 1104 for instructing whether the cache residence function be recursively set for the directory that is displayed.

The screen displays, first, the presently registered/reset state. The user operates the check buttons, as required, to change the state of the file or the like displayed on the screen.

The host computer 13 obtains the data of file or directory of which the state is changed by the user on the screen of FIG. 7, hands the data over to a file attribute control program 1331 through the API 132 to form a command for specifying the file or the like to the storage unit 14.

The command for specifying a file for registering/resetting the cache residence function, is set by expanding the command possessed by the operating system 112 that is operated by the client computer 11 or by newly registering a command to the operating system. Concretely speaking, there is the following command.

chmod cache on /user/home/somebody/file 1.txt where "cache" is an indicator representing the "registration/resetting" of the cache residence function, "on" is a word representing registration/resetting, and "/user/home/somebody/file 1.txt" is a file or directory name that is registered/reset.

Figure 8:
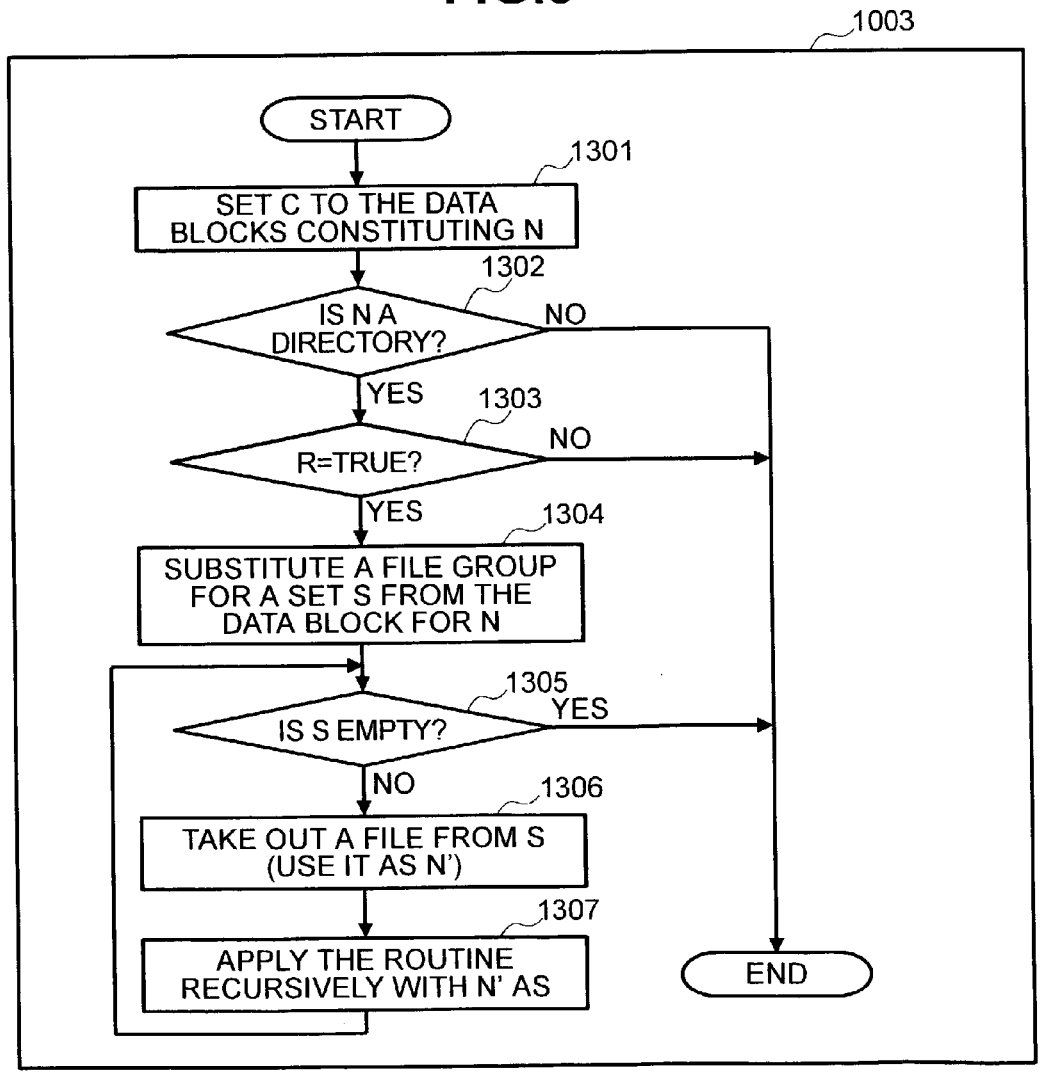
FIG. 8 is a flowchart of a processing for setting the necessity of cache residence function to the file according to the first embodiment of the invention.

FIG. 8 is a flowchart illustrating, in detail, the content of step 1003 in FIG. 6.

The host computer 13 sets the state C of registering/resetting the cache residence function to the data blocks that constitute the file N. Even when the file N is a directory, it is treated in the same manner as the file in the file system, and no particular processing is required here. This processing will be described later in detail (step 1301).

The host computer 13 checks whether the file N is a directory file. When the file N is not the directory file, the host computer 13 ends the processing (step 1302).

When the file N is a directory file, the host computer 13 recursively processes the directory, i.e., judges whether the registering/resetting state be set for the file in the directory. When it is not to be recursively processed, the host computer 13 ends the processing (step 1303).

When the directory is to be recursively processed, a list of files possessed by the directory is stored in the data block for the directory file N. Therefore, the host computer 13 regards the list of files as a set S (step 1304).

Then, the host computer checks whether the set S is empty. When the set S is empty, the host computer 13 ends the processing (step 1305). When the set S is not empty, a file is taken out from the set S and is used as N' (step 1306).

Then, by using N' as a given file, the host computer 13 executes the processing of step 1003, i.e., recursively executes the processing (step 1307).

Figure 9:
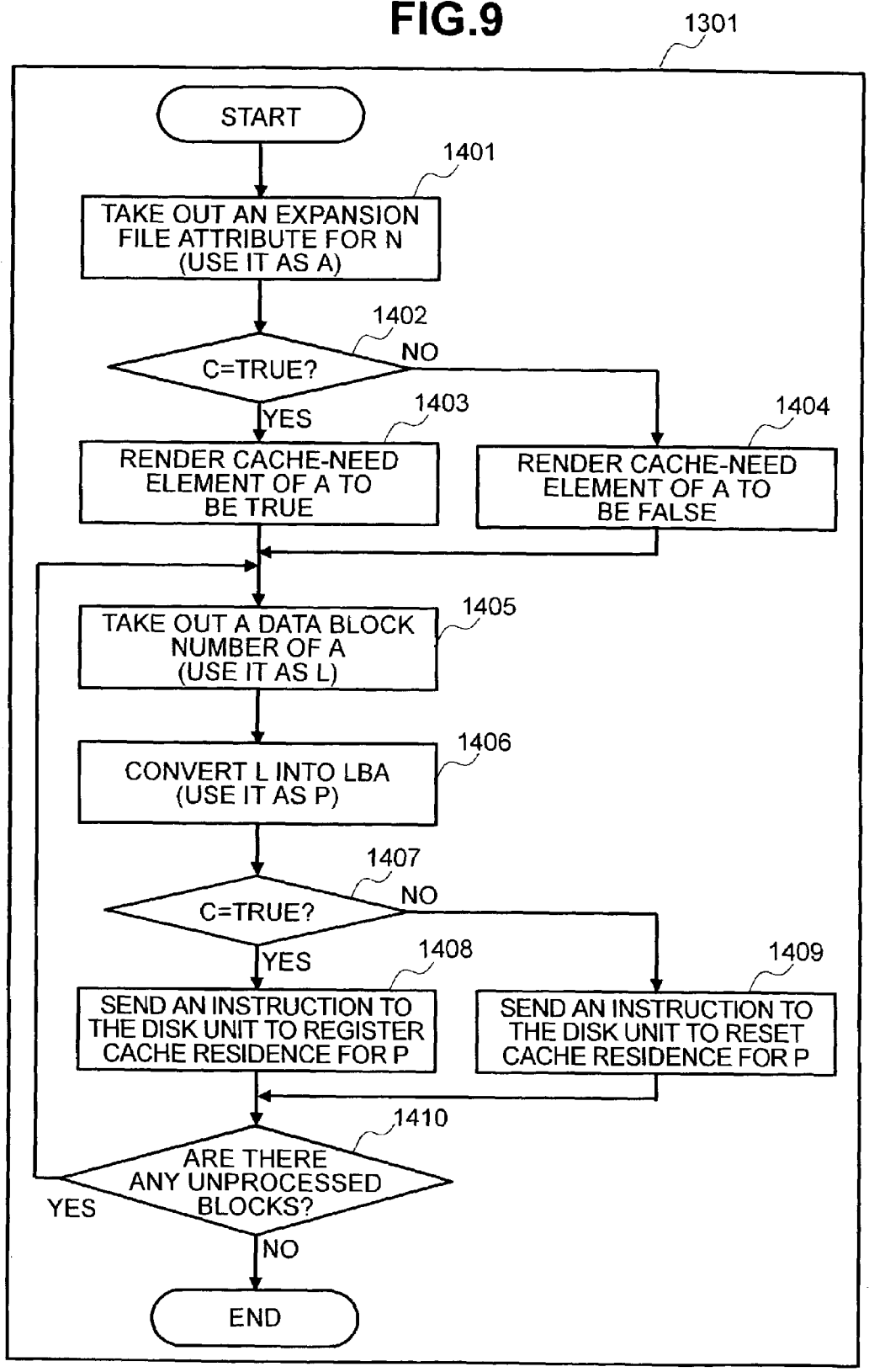
FIG. 9 is a flowchart of a processing for setting the necessity of cache residence function to the block according to the first embodiment of the invention.

FIG. 9 is a flowchart illustrating the content of step 1301 in detail. The host computer 13 takes out the extended file attribute A for the file N. The extended file attribute A is obtained by tracing the file attribute number corresponding to the file name which agrees with the file name of the file N in the directory file, from the root directory to the directory in which the file N is stored (step 1401).

Next, the host computer 13 judges whether the cache residence be registered or reset (step 1402). When residence is to be registered, the host computer 13 renders need-the-cache of the extended file attribute A to be true (step 1403). When residence is to be reset, on the other hand, the host computer 13 renders need-the-cache of the extended file attribute A to be false (step 1404). Thus, the cache residence state of the file N is set.

Thereafter, the host computer 13 takes out a data block number from the array of data block numbers of the extended file attribute A. The data block number is hereinafter regarded as L (step 1405). Thereafter, the host computer 13 converts the block number L found at step 1405 into LBA that represents the block position of the disk unit 143. Hereinafter, the LBA is regarded as P. Conversion of L into P is effected based on a conversion table possessed by the operating system 133 (step 1406).

The host computer 13 judges again whether the cache residence be registered or reset (step 1407). When residence is to be registered, the host computer 13 sends an instruction to the storage unit 14 to set 1 to the attribute bit 203 for P (step 1408). When residence is to be reset, on the other hand, the host computer 13 sends an instruction to the storage unit 14 to set the attribute bit 203 for P to 0 (step 1409). The storage unit 14 that has received an instruction executes the processing so that the block specified at a step shown in FIG. 3 is allowed to reside in the cache.

Thereafter, the host computer 13 judges whether the file N contains unprocessed data blocks. When there are contained unprocessed data blocks, the host computer 13 returns back to step 1405 to repeat the processing. When there is contained no unprocessed data block, the host computer 13 ends the processing of step 1301 (step 1410).

FIG. 10 is a diagram illustrating the constitution of a second embodiment of the computer system to which the invention is applied. In this embodiment,the storage unit 14 is connected to another storage unit 14*a* through interfaces 1501 and 1502. The storage units may be connected together through a public network or may be connected together neighboring to each other in a housing. The storage unit 14*a* is constituted in the same manner as the storage unit 14.

The extended file system management data in this embodiment includes attribute representing whether the duplication be executed in addition to the content of the file system management data described in the first embodiment. The attribute expresses whether one or more files in the file system have been duplicated in the storage unit 14*a*.

The extended file system attribute of this embodiment is the one in which an attribute representing whether the duplication be executed is added to the file attribute of the first embodiment. This attribute is for instructing the necessity of forming a ditto of the corresponding file on the storage unit 14*a*.

In this embodiment, the attribute bit 203 has a meaning of the necessity of forming a ditto, forming the ditto when the value thereof is 1, and not forming the ditto when the value thereof is 0.

FIG. 11 is a flowchart for registering/resetting the duplicating function according to the second embodiment. First, a file or a directory is determined for registering/resetting the duplicating function. This processing is executed by the client computer 11 or the management terminal 15. The details will be described later (step 1801).

Step 1802 through step 1806 are executed as the host computer 13 executes the file attribute control program 1331. The host computer 13 selects a file obtained at step 1801 from the file system, and substitutes the file name thereof and the state thereof after the duplicating function has been changed for the variables N and C, so that they can be used in the subsequent processing (step 1802).

The host computer 13 detects whether the ditto of the file N is registered (step 1803). When the ditto of the file N is to be registered, the host computer 13 conducts the processing for duplicating the metadata 404 of the file system prior to duplicating the file. The details of the processing will be described later (step 1804).

When the ditto of the file N is not be registered, the host computer 13 registers/resets the duplicating function for the file N. The details will be described later (step 1805).

Thereafter, the host computer 13 judges whether there still are files to be processed. When there still exist files, the routine returns back to step 1802 to repeat the processing. When there exists no file, the processing is ended for registering/resetting the function for executing the duplication (step 1806).

FIG. 12 is a diagram illustrating a procedure of processing at step 1804. The host computer 13 takes out the extended file system management data of the file system to which the file N belongs. Hereinafter, this data is regarded as S (step 1901).

Then, the host computer 13 judges the truth/false of the duplication execution attribute of the extended file system management data S. When it is true, the processing of step 1804 ends presuming that the metadata has been duplicated (step 1902). When the value of the duplication execution attribute is false, the host computer 13 finds the LBA range of the metadata region. The metadata region has been stored in a region which is continuing on the disk device 143, and there is only one LBA range that is to be duplicated (step 1903).

Thereafter, the host computer 13 sends an instruction to the storage unit 14 to duplicate the LBA range found at step 1903. The storage unit 14 that has received the instruction transmits the data stored in the specified LBA range of the disk unit 143 to the storage unit 14*a* through interfaces 1501 and 1502. The controller 142*a* of the storage unit 14*a* that has received the data writes the received data into the disk unit 143a (step 1904). Thereafter, the host computer 13 sets the duplicate execution attribute of the extended file system management data S to be true (step 1905).

FIG. 13 is a view of a screen displayed by the client computer 11 or the like for specifying a file for registering/resetting the duplicating function according to the embodiment.

The client program executed by the client computer 11 or the management terminal 15 connected to the host computer 13 displays the picture of FIG. 13 to a user who registers/resets the duplicating function.

The screen displays a region 2001 showing the data of directory that is now being processed, a region 2002 showing a list of files and directories stored in the directory 2001, a state where the files are being duplicated, and check buttons 2003 for specifying the registering/resetting of the duplicating function. When the screen is displayed, first, the buttons 2003 display the present state of registering/resetting the duplication, and the user is allowed to change the state as required.

The host computer 13 obtains the data representing a list of files or directories of which the states are changed by the user on the screen through the network 12, and uses it as a command for specifying the output at step 1801, i.e., for specifying the file that is to be registered/reset through the API 132 on the host computer.

The command for specifying a file that is to be registered/reset, is obtained by expanding the command possessed by the operating system 112 that is operated by the client computer 11 or by newly registering a command to the operating system.

A concrete example of the command is as follows:

chmod remotecopy on /user/home/somebody/file 1.txt where "remotecopy" is an indicator representing the "registration/resetting" of the duplicating function, "on" is a word representing registration/resetting, and "/user/home/somebody/file 1.txt" is a file or directory name that is registered/reset.

Figure 14:
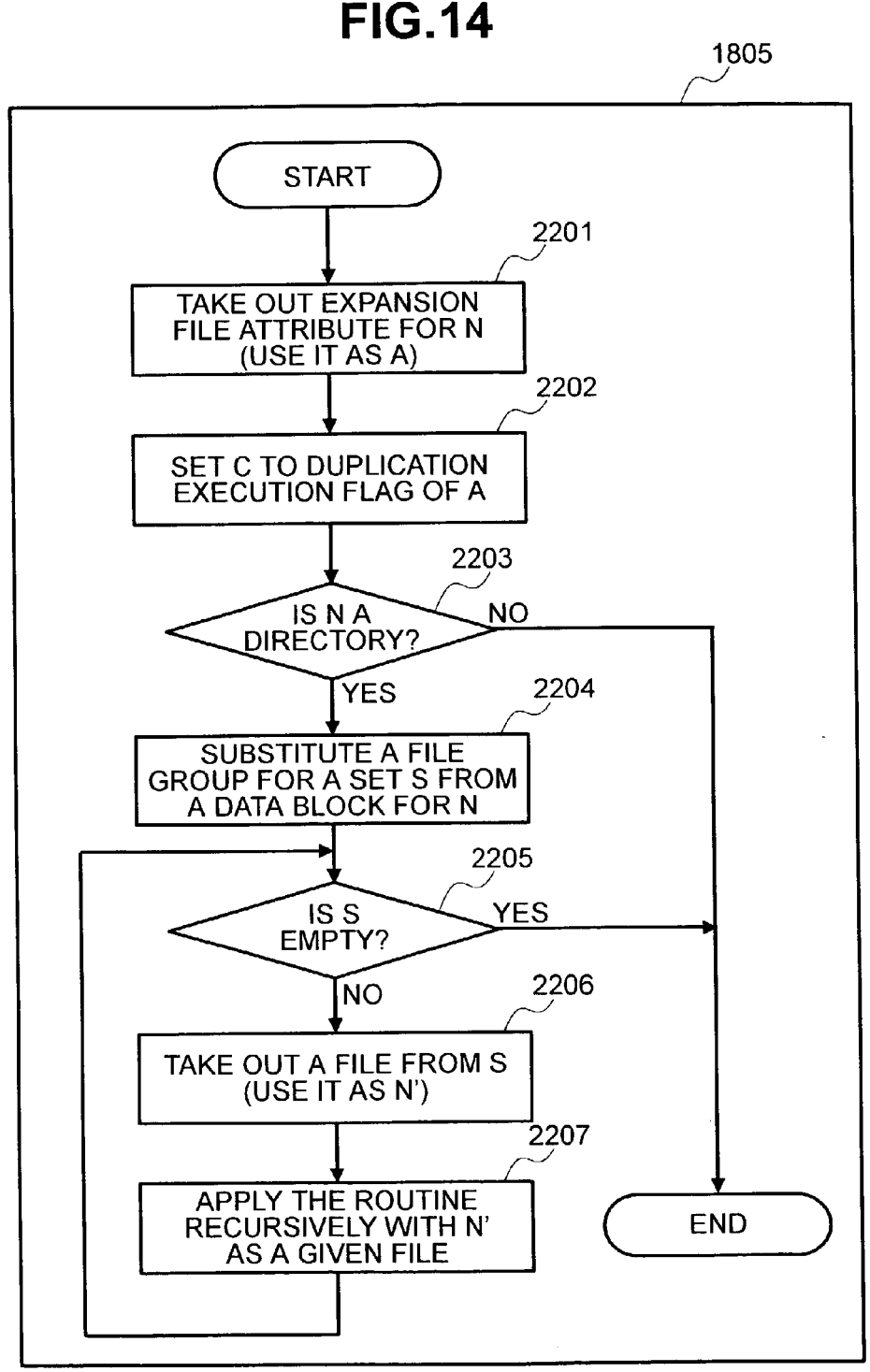
FIG. 14 is a flowchart illustrating a processing for setting the necessity of the duplicating function to the file according to the second embodiment of the invention.

FIG. 14 is a flowchart illustrating, in detail, the content of step 1805.

The host computer 13 takes out the extended file attribute A for the file N (step 2201). The extended file attribute A for the file N is obtained by tracing the file attribute number corresponding to the file name which agrees with the file name of the file N in the directory file, from the root directory to the directory in which the file N is stored.

The host computer 13 sets C which is a truth/false value of duplication execution attribute for A (step 2202). Depending upon the kind of A, the host computer 13 checks whether N is a directory. When it is not the directory, the host computer 13 ends the processing at step 1805 (step 2203).

When the directory is to be recursively processed, a list of files possessed by the directory is stored in the data blocks for the directory file N. Therefore, the host computer 13 regards the list of files as a set S (step 2204).

Thereafter, the host computer 13 checks whether the set S is empty. When the set S is empty, the host computer 13 ends the processing (step 2205).

When the set S is not empty, a file is taken out from the set S and is used as N' (step 2206).

Thereafter, the host computer 13 recursively executes the processing of step 1805, i.e., executes the processing with N' as a given file (step 2207).

Figure 15:
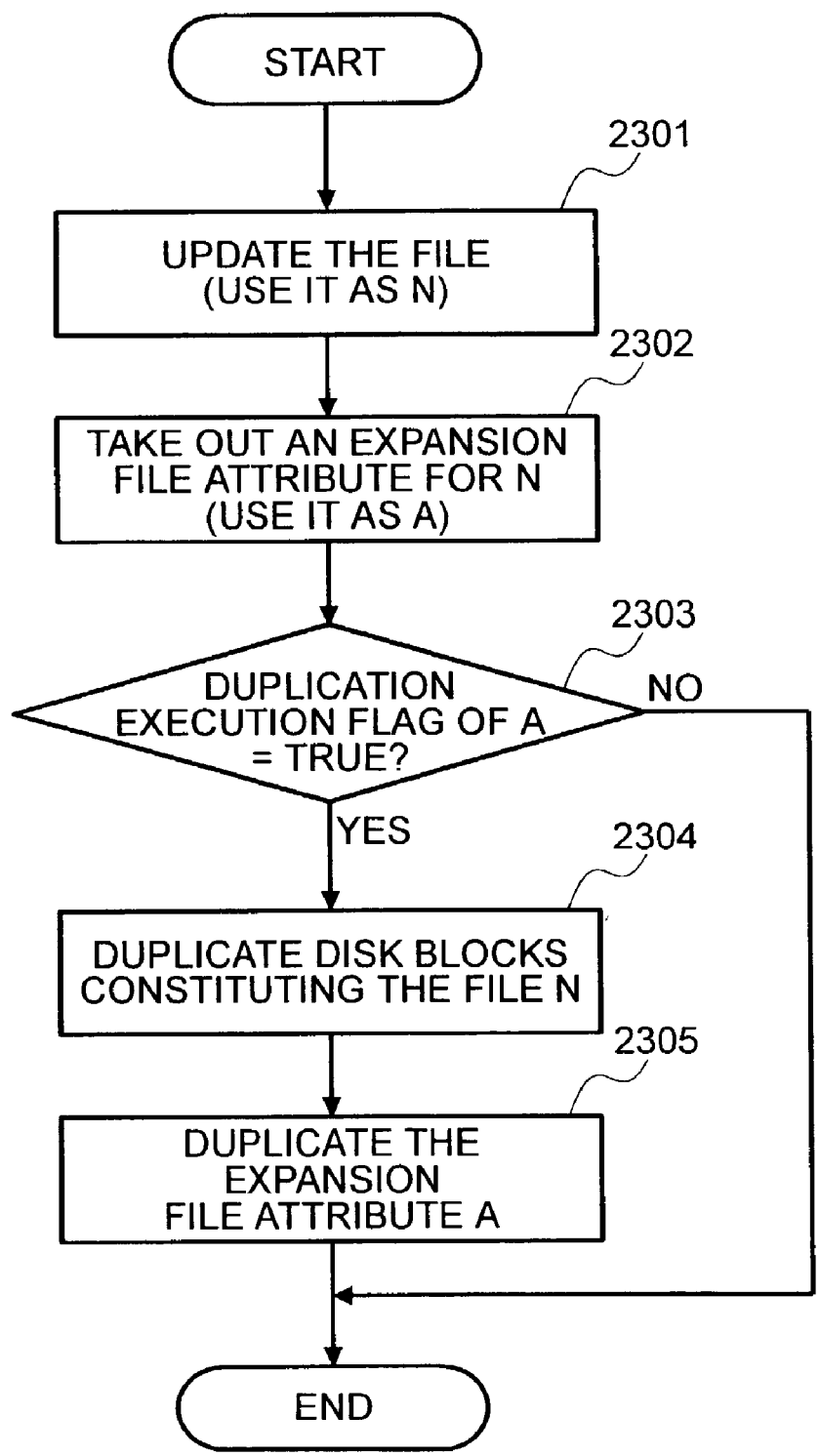
FIG. 15 is a flowchart illustrating how to execute the duplication according to the second embodiment of the invention.

FIG. 15 is a flowchart illustrating the duplication execution processing according to the embodiment. This processing is an expansion of the file updating processing possessed by the operating system 133 and wherein step 2301 is the processing of the operating system, and step 2302 through step 2305 are expansion processing according to the embodiment.

The host computer 13 updates the file content (step 2301). Thereafter, the host computer 13 takes out the extended file attribute of the updated file N, and uses it as A (step 2302).

Thereafter, the host computer judges the truth/false value of the duplication execution flag of the extended file attribute A. When the truth/false value is false, there is no need of executing the duplication, and the processing ends (step 2303).

When the value of the duplication execution flag is true, the host computer 13 sends an instruction to the storage unit 14 so as to convert the block numbers from the extended file attribute A into LBAs for all disk blocks constituting the file N, and to form the ditto of data for the LBAs. The storage unit 14 that has received the instruction transmits the data blocks to the storage unit 14a. The storage unit 14a writes the received data blocks into the disk unit 143 (step 2304).

Thereafter, the host computer 13 sends an instruction to the storage unit 14 so as to form ditto of data for the LBA that stores the extended file attribute A (step 2305).

The first embodiment which is one of the above-mentioned embodiments makes it possible to refer to the files at a high speed, and the second embodiment makes it possible to duplicate the data in a unit of a file.

What is claimed is:

1. A system for storing files comprising:
a host computer coupled to a plurality of client computers, each client computer sending a file access request which has a staging and de-staging request; and
a first storage unit coupled to the host computer, wherein the first storage unit has a first disk device, a first cache memory and a first disk controller coupled to the first disk device and the first cache memory, the first disk controller receiving block data sent from the host computer and storing the block data in the first cache memory and controlling to stage or de-stage for each block data and
the host computer has an operating system, which configures a file system in the first storage unit and manages the correspondence between a file of the file system and a plurality of blocks data in the first disk device configuring the file, and a first control unit,
wherein the first control unit is configured to receive each file access request and send to said first storage unit a plurality of attribute setting/changing instructions which are used to set/change an attribute information of each block data corresponding to each file access request based upon the staging and de-staging request, and
the first disk controller is configured to manage the attribute information for each block data and receive the plurality of attribute setting/changing instructions and setting/changing the attribute information based on the received attribute setting/changing instructions from the first control unit and is configured to recognize the need for staging or destaging based upon the attribute information for each block data and controls staging and destaging based upon such recognition, wherein the staging causes the block data to be transferred to the first cache memory from the disk device, and the destaging causes the block data to no longer have permission to reside in the first cache memory, whereby block data of the file designated by each client computer is staged or destaged in the first cache memory of the first storage unit, and whereby the first storage unit stores data blocks in said first disk device corresponding to a plurality of files from the plurality of client computers.

2. A system for storing files according to claim 1 further comprising:

a second storage unit coupled to the first storage unit, the second storage unit having a second disk device and a second disk controller coupled to the second disk device, and wherein the control unit is configured to receive information indicating a particular file, whose data is duplicated in the first storage unit and the second storage unit, specify blocks configuring the particular file designated in the received information by utilizing the correspondence between the file of the file system and the plurality of blocks data in the disk device of the first storage unit, and instruct the first storage unit to duplicate data of the specified blocks to the second disk device of the second storage unit, and the first disk controller of the first storage unit is configured to send the data of the blocks specified by the control unit to the second storage unit and the second storage unit is configured to store the received data in the second disk device of the second storage unit according to an instruction from the control unit, whereby data configuring the particular file is duplicated in the first storage unit and the second storage unit.

3. A system for storing files according to claim 2, wherein the control unit is configured to specify blocks storing file data of the file and blocks storing meta data of the file.

4. A system for storing files according to claim 2, wherein the control unit is configured to receive information indicating a directory including at least one file, whose data is duplicated in the first storage unit and the second storage unit, specify blocks configuring the at least one file included in the directory designated in the received information according to the configuration of the file system configured by the operating system, and instruct the first storage unit to duplicate data of the specified blocks to the second disk device of the second storage unit, and the first disk controller of the first storage unit is configured to send the data of the blocks specified by the control unit to the second storage unit and the second storage unit is configured to store the received data in the second disk device of the second storage unit according to an instruction from the control unit, whereby data of the at least one file included un the directory is duplicated in the first storage unit and the second storage unit.

* * * * *